(12) United States Patent
Verschueren

(10) Patent No.: US 7,873,250 B2
(45) Date of Patent: Jan. 18, 2011

(54) LCD WITH REDUCED FLICKER AND A METHOD FOR MANUFACTURING THEREOF

(75) Inventor: Alwin Rogier Martijn Verschueren, Eindhoven (NL)

(73) Assignee: Chimei Innolux Corporation, Miao-Li County (TW)

( * ) Notice: Subject to any disclaimer, the term of this patent is extended or adjusted under 35 U.S.C. 154(b) by 121 days.

(21) Appl. No.: 11/816,570

(22) PCT Filed: Feb. 17, 2006

(86) PCT No.: PCT/IB2006/050520

§ 371 (c)(1),
(2), (4) Date: Aug. 17, 2007

(87) PCT Pub. No.: WO2006/087685

PCT Pub. Date: Aug. 24, 2006

(65) Prior Publication Data

US 2008/0204637 A1    Aug. 28, 2008

(30) Foreign Application Priority Data

Feb. 21, 2005    (EP)    ................................ 05101309

(51) Int. Cl.
G02F 1/1335    (2006.01)
(52) U.S. Cl. ...................................... 385/113
(58) Field of Classification Search .................. 349/113
See application file for complete search history.

(56) References Cited

U.S. PATENT DOCUMENTS 6,154,264 A * 11/2000 Koide et al. .................. 349/113
6,912,027 B2   6/2005 Kim
2003/0151712 A1   8/2003 Inoue et al.
2004/0032552 A1   2/2004 Kim
2006/0285036 A1   12/2006 Inoue et al.

FOREIGN PATENT DOCUMENTS

CN    1431548 A    7/2003
CN    1475841 A    2/2004

OTHER PUBLICATIONS

Chinese Office Action dated Mar. 27, 2009 for corresponding Chinese patent application No. 2006800054202.

* cited by examiner

*Primary Examiner*—Jerry T Rahll
(74) *Attorney, Agent, or Firm*—Fish & Richardson P.C.

(57) ABSTRACT

A liquid crystal display having a plurality of pixels (1), comprising an lower electrode layer (21), a transparent upper electrode layer (13), a liquid crystal layer (10) arranged between the upper and lower electrode layers (13, 21) and an at least partly reflective layer (20, 30), for at least partly reflecting incident light having passed through the liquid crystal layer (10). The reflective layer (20, 30) is electrically isolated from the lower electrode layer (21) and positioned between the liquid crystal layer (10) and the lower electrode layer (21). With this arrangement the DC-component of an electric field in the liquid crystal layer can be eliminated or, at least, considerably reduced, and a flicker-free reflective or transflective LCD thereby realized. Furthermore, flicker is eliminated without having to pay the price of reduced reflectance of the reflective layer and the consequent reduction in display brightness and contrast.

25 Claims, 5 Drawing Sheets

LCD WITH REDUCED FLICKER AND A METHOD FOR MANUFACTURING THEREOF

The present invention relates to a liquid crystal display (LCD).

The invention further relates to a method for manufacturing a liquid crystal display according to the present invention.

Liquid crystal displays (LCDs) are becoming increasingly popular in applications ranging from small, hand-held devices to large flat-panel television sets. Generally, the requirements on the LCD are different for each application area. In one application, brightness and viewing angle might be more important than current consumption, which could be crucial to another application.

In an LCD, a liquid crystal (LC) display generally comprises an liquid crystalline material (LC-material) positioned between two substrates, for example glass, on which controllable electrodes have been formed. The properties of light passing through the LC-material can be modified by applying a voltage over the LC-material, using the electrodes. To avoid chemical deterioration of the LC-material, this voltage—the LC drive voltage—is applied at a frequency—the LC drive frequency. The LC-display is typically also equipped with row and column selection lines, alignment layers, one or more polarizers and, in the case of a color display, color filters.

The light passing through the LC-material can either emanate from a backlight positioned behind the liquid crystal display or be incident light which is reflected back towards the viewer. An LCD in which light from a backlight is selectively transmitted trough the LC-display, is called a transmissive LCD. A transmissive LCD has transparent electrodes positioned on both sides of the LC-material. If it is the incident light that is selectively reflected back towards the viewer, the LCD is called a reflective LCD. Such an LCD conventionally has transparent electrodes on the upper (viewer) side of the LC-material and reflective, metallic electrodes on the lower side.

There is also a class of LCDs called transflective LCDs. The LC-displays of these LCDs have both transmissive and reflective properties. They have a lower electrode that is partly reflective and partly transmissive, for example a reflective layer comprising a transmissive aperture for passing light emanating from the backlight.

For applications in which power consumption is not a major issue, transmissive LCDs are normally used. In applications where low power consumption is crucial, such as portable devices, reflective and transflective LCDs are advantageously used.

Even though LCDs in general exhibit considerably less flicker than conventional CRT displays, flicker is still an issue, especially for applications in which the requirements for low power consumption make it undesirable to drive the LCD at a high frequency. If the LCD is driven at a frequency which is higher than twice the critical flicker frequency (CFF)—typically 60-80 Hz—the human eye will be unable to discern flicker.

Although advantageous from a power consumption point-of-view, a lower drive frequency can lead to a significant deterioration in display quality resulting from flicker in reflective and transflective LCDs in particular.

In the US patent application US 20040004686, an LCD is disclosed, in which the flicker-issue is addressed by adding transparent electrodes on the reflective-electrode-side of the LC-material. These transparent electrodes are positioned closer to the LC-material than the metallic reflective electrodes.

A problem with the approach disclosed in US 20040004686 is that the incident light is forced to pass through an additional "transparent" layer twice, which will reduce the reflectivity of the reflector and thereby the valuable contrast and brightness of the device.

In view of the above-mentioned and other drawbacks of the prior art, a general object of the present invention is to provide an improved liquid crystal display and display.

In particular, it is an object of the present invention is to enable flicker free operation of reflective and transflective LCDs.

This object is, according to a first aspect of the invention, achieved by a liquid crystal display according to the independent claim 1.

Thus, the LCD comprises a lower and an upper electrode, a liquid crystal layer arranged between the upper and lower electrodes and a reflective layer, configured to at least partly reflect incident light having passed through the liquid crystal layer. The reflective layer is arranged between the liquid crystal layer and the lower electrode, and is electrically isolated from the lower electrode.

The elements being 'electrically isolated' within the context of the present application should be construed as the elements not being in direct electric contact with each other, i.e. a direct flow of electrical current from one element to the other is substantially inhibited. However, a capacitive coupling between the elements may exist.

The present invention is based on the realization that the amount of flicker in an LCD can be eliminated or, at least, considerably reduced, by eliminating or, at least, substantially reducing the DC-component of an electric field in the LC layer.

By arranging the reflective layer between the lower electrode and the LC layer and electrically isolated from the lower electrode layer, this electric symmetry can be achieved, and a flicker-free LCD thereby realized, by forming the lower electrode layer in a suitable material.

An additional advantage of the present invention compared to prior art is that flicker is eliminated, or at least considerably reduced, without having to pay the price of reduced reflectance of the reflective layer and the consequent reduction in display brightness and contrast.

The prior art device has a "transparent" electrode on top of a reflective electrode, however in practice, transparent electrode materials such as indium tin oxide (ITO) still absorb an appreciable fraction of passing light, for example 10% for a thin layer electrode. However especially in transflective liquid crystal displays, the requirements on the reflective layer are very strict, and even such a decrease in reflectance is unacceptable. In the LCD according to the present invention, the reflectance of incident light having passed through the liquid crystal layer is as high as possible.

Preferably, the lower electrode layer can be formed on a glass or plastic substrate, by means of sputtering or other deposition techniques. The reflective layer can then be formed on top of the lower electrode layer in a later manufacturing process, possibly followed by other layers, such as an alignment layer to align the liquid crystal molecules in the LC layer.

Analogously, the transparent upper electrode can be formed, by means of sputtering or other deposition techniques, on another substrate. The transparent upper electrode is preferably manufactured in indium tin oxide (ITO), indium zinc oxide (IZO) or equivalent. On top of the transparent upper electrode layer can, after suitable patterning, other layers be formed, such as an alignment layer.

Preferably, a work function of the lower electrode differs from a work function of the upper electrode by less than 0.5 eV.

The "work function" of a material is, by definition, the amount of energy required to move an electron in the material from the Fermi level to the vacuum level. In the case of a conductor, this is equivalent to the energy needed to remove the electron from the material.

When two conducting materials with different work functions are placed in contact with each other, a "contact potential", equal to the difference in work function between the conducting materials, will arise at thermal equilibrium.

By keeping the work function difference between the upper and lower electrodes below 0.5 eV, preferably through the selection of a suitable material for the lower electrode, the DC component of the electric field in the LC layer can be kept low—preferably below 0.5 V. Consequently, flicker is reduced to a particularly large extent, without sacrificing the reflectance of the reflective layer, which is placed on top of the lower electrode.

Advantageously, the lower electrode and the upper electrode are manufactured in the same material, such as ITO or IZO.

By manufacturing the lower and upper electrodes in the same material, the work function difference between the upper and lower electrodes is practically eliminated. With this arrangement, in combination with a proper selection of underlying conductive layer materials, electric symmetry will be achieved with respect to the LC layer and flicker will thereby be eliminated while maintaining the reflectance of the reflective layer.

According to another embodiment, the upper electrode can be coated with a passivation layer, thereby improving the light stability of the liquid crystal display.

By introducing a passivation layer on top of the upper electrode, the work function of the upper electrode is "conserved" even if the LCD is subjected to excessive radiation by, for example, sun light. Thereby, the flicker free behavior of the LCD is maintained over time, even if the LCD is subjected to sun light.

According to a further embodiment, the reflective layer can be electrically conductive and an electrically insulating material be arranged to separate the lower electrode and the reflective layer.

The purpose of the reflective layer is to have a high reflectance. By selecting a suitable metal, such as aluminum (Al) or an aluminum-neodynium (Al—Nd) alloy, a high reflectance in the entire relevant wavelength range is ensured.

In order to maintain the advantage of electrical symmetry around the LC layer, the electrically conductive reflective layer is preferably separated from the lower electrode layer by an insulating layer, which can be formed through sputtering, spinning or any other suitable layer-forming technique. The insulating layer can be made of an oxide, such as AlxOy, SixOy, a nitride, such as SixNy or a spin-on polymer. The most important properties of the layer is that it is insulative and pin-hole free.

Preferably, a capacitance between the above-mentioned conductive reflective layer and the lower electrode is more than 10 times as large as a capacitance between the reflective layer and the upper electrode.

With the conductive reflective layer being electrically separated from the lower electrode through the above-mentioned insulating layer, there is no galvanic connection between the two layers. An LC drive signal is thus capacitively coupled from the lower electrode to the reflective conductive layer to form a voltage over the LC layer between the reflective conductive layer and the upper electrode. In order to form an electric field of sufficient amplitude for switching the LC-layer without having to increase the driving voltage between the electrodes, the reflective conductive layer should be considerably stronger coupled to the lower electrode than to the upper electrode.

In simplified terms, the pixel can be considered to comprise two parallel plate capacitors in both of which one of the plates is the electrically floating conductive reflective layer. If the permittivities of the dielectrica of the first capacitor (lower electrode—insulating layer—reflective layer) and the second capacitor (reflective layer—LC-layer etc.—upper electrode) are assumed to be close to equal, the capacitances are determined by the distances between the plates of the first and second capacitors, respectively. In order to fulfill the above-mentioned requirement, the distance between the lower electrode and the reflective layer should thus be less than a tenth of the distance between the reflective layer and the upper electrode.

According to a further embodiment, the reflective layer can be arranged to be discharged through a discharging means, which is configured to discharge the reflective layer with a time constant being considerably longer than an LCD drive period, and to bring the reflective layer to the same potential as the upper electrode.

In order to obtain the desired electric symmetry with respect to the LC-layer, it is important that the reflective layer is not charged. The discharge of the reflective layer can be performed as a process step during manufacturing of the LC-display or continuously. To enable continuous discharging of the LC-display, the reflective layer can be connected to a suitable reference potential through a discharging means, such as a resistor. To achieve electric symmetry with respect to the LC-layer, there should be no DC-voltage between the reflective layer and the upper electrode. Therefore, the reflective layer should be discharged to assume the same potential as the upper electrode, when the pixel is in its unswitched state. In order not to detrimentally influence the operation of the LC-display, the discharging means is further preferably configured to discharge the reflective layer with a time constant being considerably longer than the LCD drive period.

The "time constant" of the discharging of a capacitor through a resistor is defined as the product of the resistance and the capacitance—$\tau=RC$.

According to a preferred embodiment, the liquid crystal display can have a plurality of pixels, each being divided into a reflective sub-pixel, which is arranged to reflect incident light, and a transmissive sub-pixel, which is arranged to transmit light.

By dividing each pixel of the LC-display into a reflective sub-pixel, comprising a reflective layer, and a transmissive sub-pixel, without a reflective layer, a transflective LC-display is formed. This displays is ideally suited for use in portable electronic devices, such as mobile phones. The transflective LC-display can be used as a purely transmissive LC-display, a purely reflective LC-display, not requiring an energy consuming backlight, or operate transmissively and reflectively simultaneously.

According to another embodiment of the above-mentioned transflective liquid crystal display, each reflective sub-pixel can comprise a spacer layer positioned between the lower electrode layer and the reflective layer.

By introducing a spacer layer positioned between the lower electrode layer and the reflective layer, the reflective layer can be brought closer to the upper electrode. Thereby, the optical path length in the reflective mode of the LC-display can be adapted to the optical path length in the transmissive mode.

Preferably, the reflective layer is moved to be situated at about half the cell gap distance between the lower and upper electrodes.

Preferably said reflective layer can be electrically conductive and each reflective sub-pixel further comprise a second conductive layer, being separated from the lower electrode layer by an insulating layer, and connected to the reflective layer by a via connector extending through the spacer layer, thereby enhancing a capacitive coupling between the lower electrode and the reflective layer.

One way of enhancing the capacitive coupling between the lower electrode and the reflective layer following the introduction of the spacer layer is to add a second conductive layer positioned between the spacer layer and the lower electrode and electrically connecting this second conductive layer to the electrically conductive reflective layer. The distance between the lower electrode and the second conductive layer can be kept very small, by forming a thin insulating layer between these layers. Thereby, the capacitance of the parallel plate capacitor formed by the second conductive layer and the lower electrode can be kept considerably larger than the capacitance of the parallel plate capacitor formed by the upper electrode and the conductive reflective layer. The second conductive layer and the via connector are, in the above-described case preferably made of the same material as the reflective material or of a material with essentially the same work function as the reflective layer.

Alternatively, said reflective layer can be electrically conductive and each reflective sub-pixel further comprise a second conductive layer, being separated from the lower electrode layer by an insulating layer, and connected to the reflective layer by a via connector extending through the spacer layer, thereby enhancing the capacitive coupling between the lower electrode and the reflective layer.

Another way of enhancing the capacitive coupling between the lower electrode and the reflective layer is to galvanically connect the via connector to the lower electrode, thereby connecting the lower electrode galvanically to the second conductive layer being placed on the LC layer side of the spacer layer. The second conductive layer is then separated from the reflective conductive layer by an insulating layer placed between said layers. The second conductive layer and the via connector are, in the above-described case preferably made of a material with essentially the same work function as the lower electrode.

According to a second aspect of the invention, there is provided a method for manufacturing a liquid crystal display, comprising the steps of:
providing a lower substrate having a lower electrode, an insulating layer and an electrically conductive reflective layer;
discharging the reflective layer;
arranging a liquid crystal layer and an upper substrate, having a transparent upper electrode, so that the liquid crystal layer is positioned between the reflective layer and the upper electrode.

As previously discussed, it is important to ensure that the conductive reflective layer is discharged to avoid introducing a DC component in the electric field in the LC layer.

By discharging the reflective layer in the manufacturing process, ideal conditions are created for achieving a flicker-free reflective or transflective LCD.

According to one embodiment, said discharging of the reflective layer can be performed by placing the reflective layer in contact with a slab in the same material as the reflective layer, said slab being electrically floating and having a sufficiently large capacitance to ground to discharge the reflective layer, said capacitance being much larger than the capacitance from the reflective layer to ground.

By bringing the conductive reflective layer in contact with a slab in the same material, the occurrence of a contact potential due to a work function difference between the two bodies is avoided. When the reflective layer comes in contact with the slab, the charge on the reflective layer will redistribute over the combined conductive body—the reflective layer and the slab. This redistribution will be proportional to the capacitance to ground of the reflective layer and the slab, respectively. Thus, the reflective layer can be effectively discharged by using a slab having a much larger capacitance to ground than the reflective layer. In practice, this is done by using a slab of considerably larger volume than the reflective layer.

The reflective layer is thus discharged by the slab without the introduction of a contact potential term.

According to another embodiment, said discharging of the reflective layer can comprise the steps of:
grounding the lower electrode;
electrically connecting the lower electrode and the reflective layer via a voltage source;
applying a voltage between the lower electrode and the reflective layer, said voltage being adapted to cancel a contact potential between said lower electrode and said reflective layer; and
disconnecting the lower electrode from the reflective layer.

By following the above-described sequence when discharging the conductive reflective layer in the manufacturing process of the LC-display, the reflective layer can be discharged without a contact potential term being introduced. The work function difference between the lower electrode and the reflective layer is cancelled out by the introduction of a voltage from a voltage source.

These and other aspects of the present invention will now be described in more detail, with reference to the appended drawings showing a preferred embodiment S of the invention.

FIG. 1b is a section view of the pixel in FIG. 1a,

FIG. 1c is an electrical circuit representing the pixel in FIG. 1a,

Figure 2:
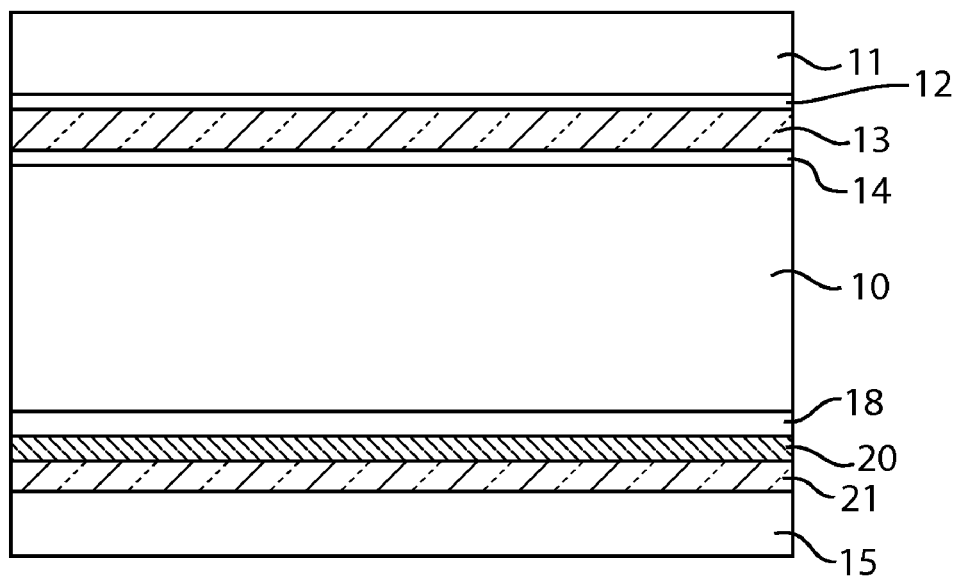
Figure 3:
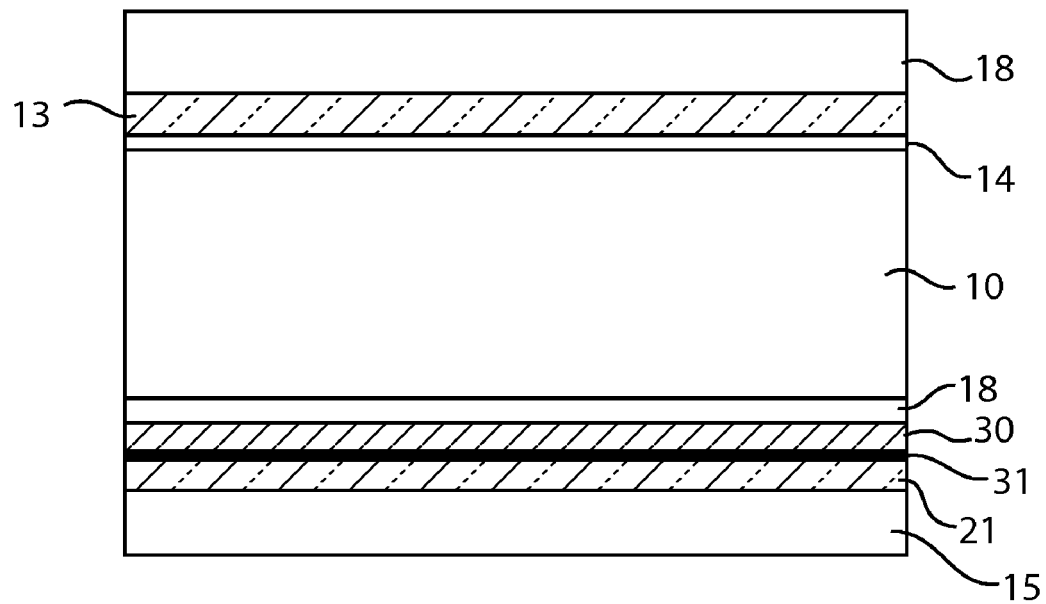
Figure 4A:
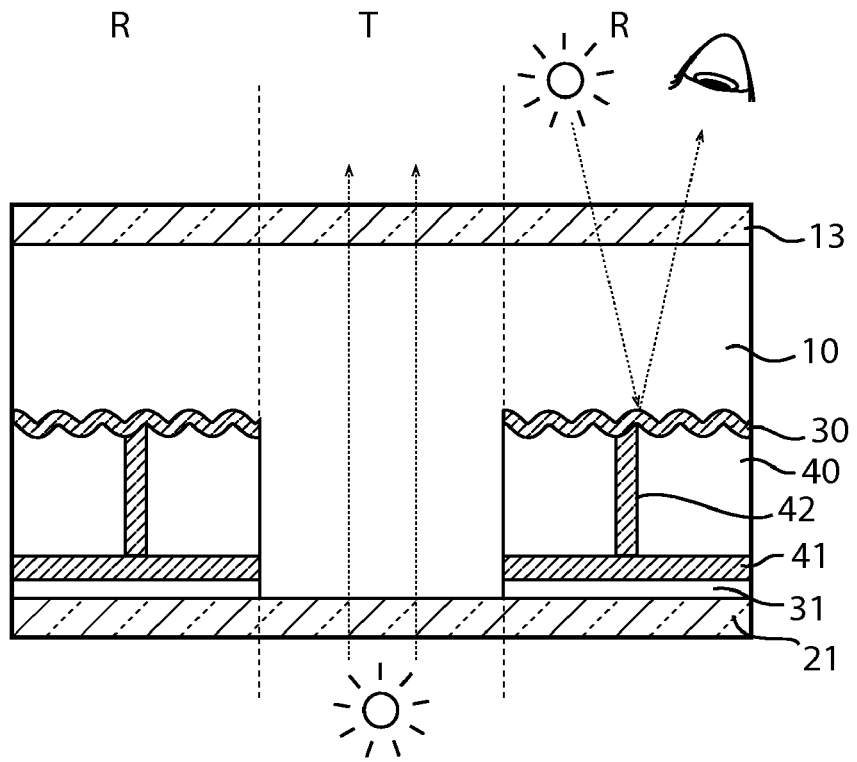
Figure 4B:
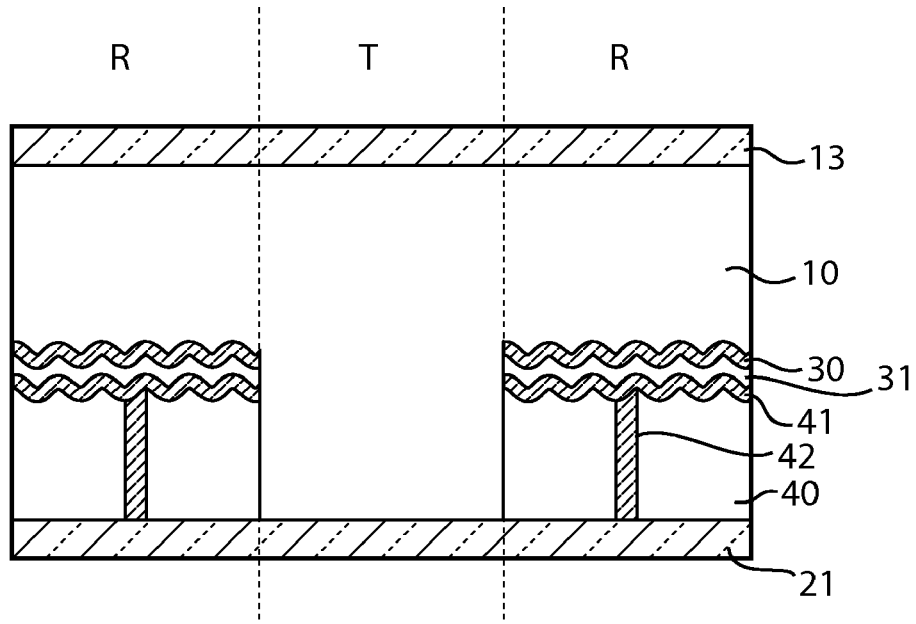
Figure 4C:
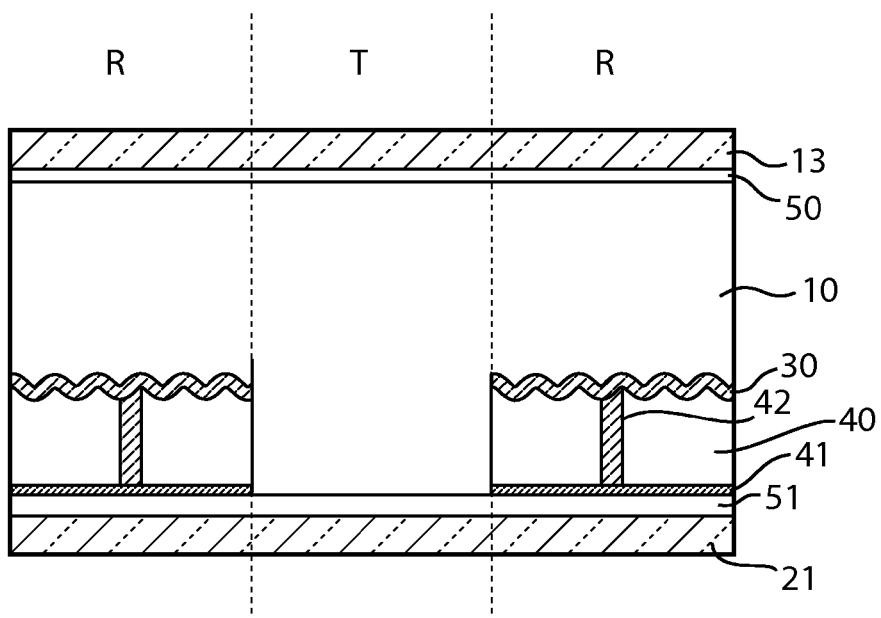
Figure 5A:
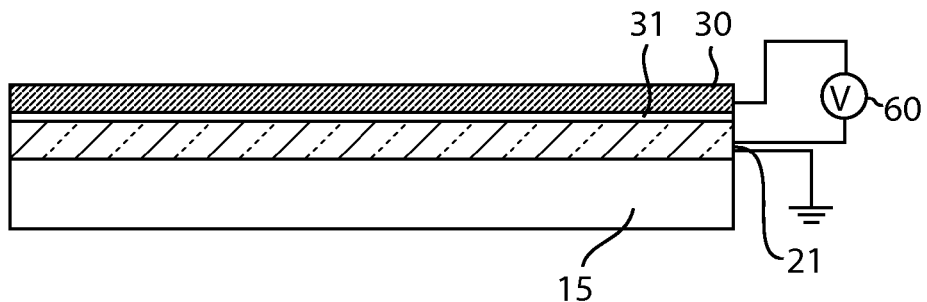
Figure 5B:
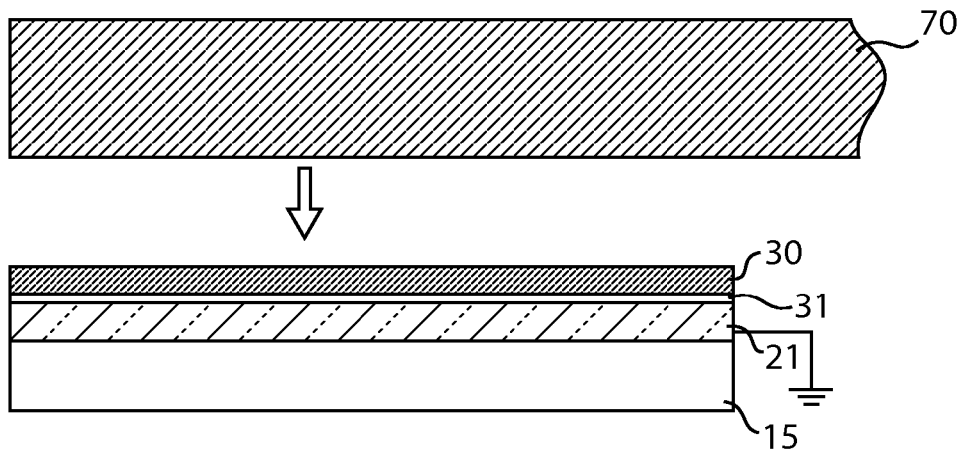

FIG. 2 is a schematic section view of a reflective pixel in a liquid crystal display according to a first embodiment of the present invention, FIG. 3 is a schematic section view of a reflective pixel in a liquid crystal display according to a second embodiment of the invention, FIG. 4a is a schematic section view of a transflective pixel in a liquid crystal display according to a first example of a third embodiment of the invention, FIG. 4b is a schematic section view of a transflective pixel in a liquid crystal display according to a second example of a third embodiment of the invention, FIG. 4c is a schematic section view of a transflective pixel in a liquid crystal display according to a third example of a third embodiment of the invention, FIG. 5a is a schematic section view of a part of a pixel illustrating a first method of discharging a reflective layer, FIG. 5b is a schematic section view of a part of a pixel illustrating a second method of discharging a reflective layer.

Figure 1A:
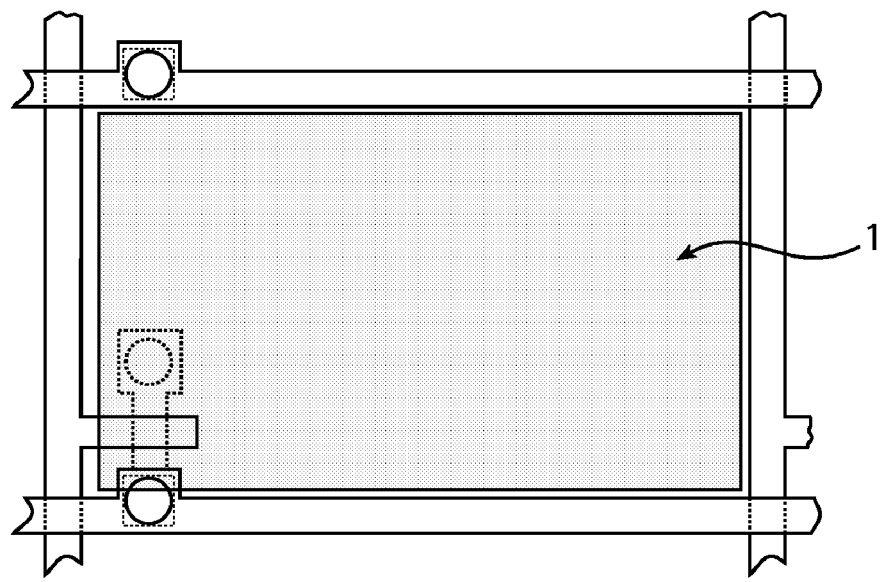
FIG. 1a is a top view of a reflective pixel of a prior art LCD.
Figure 1B:
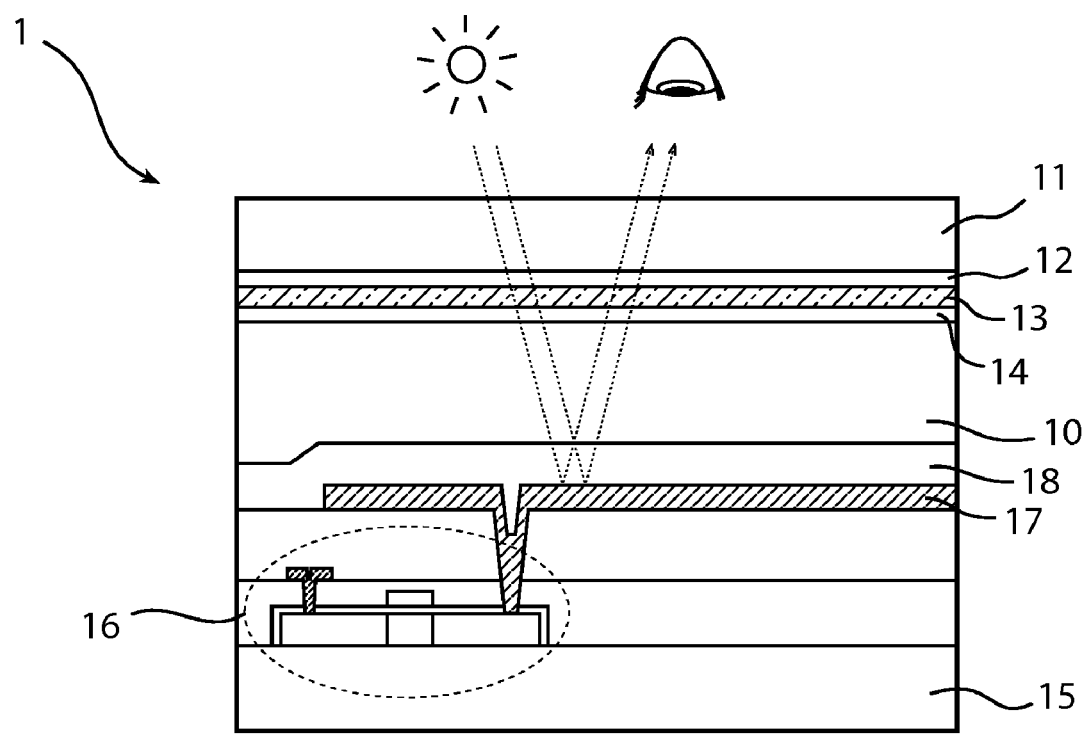

FIGS. 1a-b show, by way of reference, a top view and a section view of a reflective pixel 1 according to prior art. In this prior art example, a liquid crystal (LC) material 10 is sandwiched between an upper glass substrate 11, having a polarizer 12, a transparent ITO electrode 13 and an alignment layer 14, and a lower glass substrate 15 on which a thin film transistor (TFT) 16 is formed to drive a lower reflective Al electrode 17 which is coated with a second alignment layer 18.

When no voltage is applied over the LC layer 10, the pixel will be dark, since the polarization direction will be shifted by the LC layer 10 and thereby preventing the reflected light from exiting through the polarizer 12. When, on the other hand, as illustrated in FIG. 1*b*, a voltage is applied over the LC layer, the LC molecules will be oriented in the direction of the electric field and will not change the polarization direction of the light. Therefore, the light will be able to exit through the polarizer 12 following reflection on the reflector 17.

Pixels of the kind shown in FIGS. 1*a-b* are prone to exhibit image-degrading flicker, which is noticeable to a viewer when the LC is driven at a frequency below twice the critical flicker frequency (CFF)—around 60-80 Hz. A reason for the flicker is the existence of a DC electric field in the LC layer. One major reason for the occurrence of such a DC electric field is that the pixel is not electrically symmetrical with respect to the LC layer, which will be shown below.

Figure 1C:
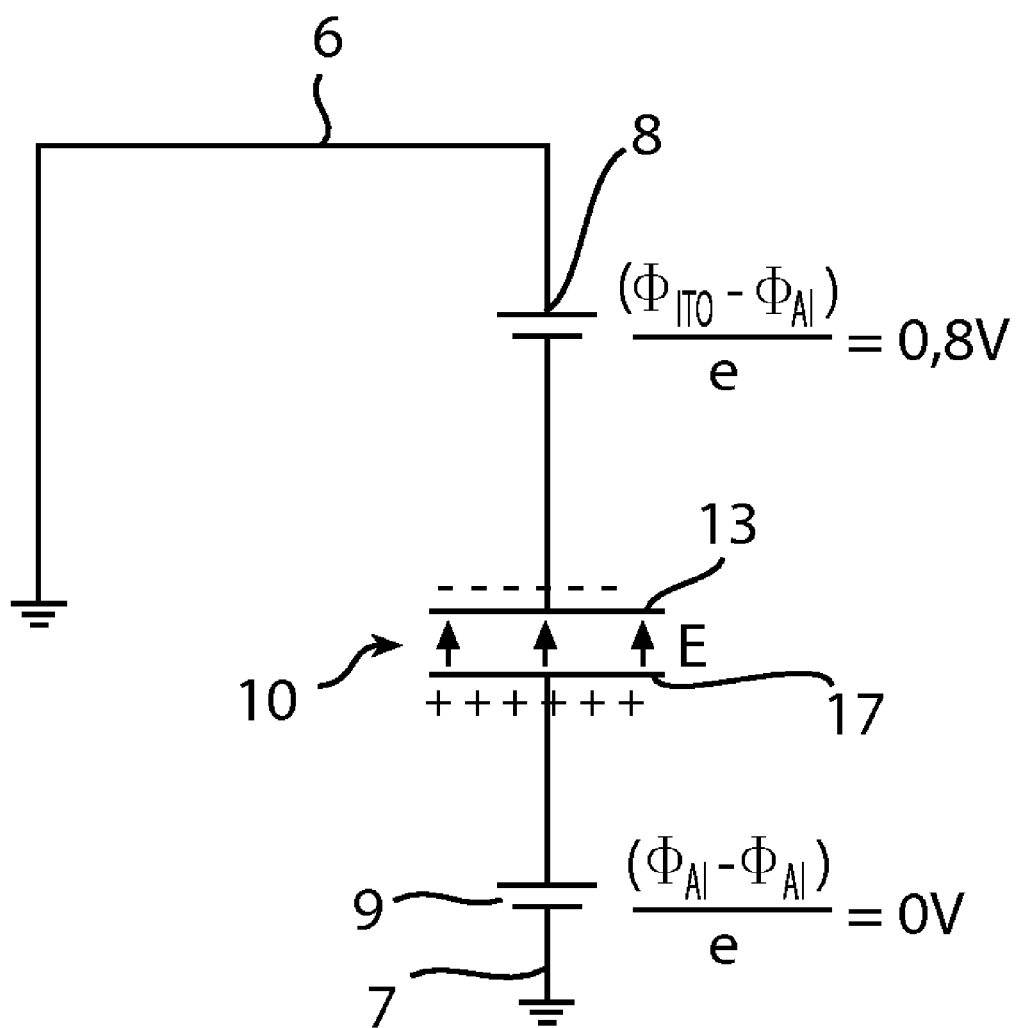

Referring here to FIG. 1*c*, we assume that the upper electrode 13 of the pixel 1 and the lower reflective electrode 17 are both connected to ground through Al-wires 6, 7. We further assume that the upper electrode 13 is manufactured in ITO and that the lower reflective electrode 17 is made of Al. The work functions for these materials are:

ITO 5.1 eV
Al 4.3 eV

As shown in FIG. 1*c*, there will, on the upper side of the pixel, be a voltage over the Al-ITO connection 8 amounting to 5.1−4.3=0.8 V, the potential on the upper electrode 13 thus amounting to −0.8 V. On the lower side of the pixel 1, there will be no voltage over the Al—Al connection 7 since there is no work function difference due to the fact that the same material has been chosen for the connector 7 as for the reflective layer. The voltage over the LC layer 10 thus becomes 0.8 V.

In the configuration shown in FIGS. 1*a-b*, there is thus not electric symmetry with respect to the LC layer 10 and flicker is likely to occur.

In the following, similar or identical elements have been given identical reference numerals.

In FIG. 2 a schematic section view of a reflective pixel in a liquid crystal display according to a first embodiment of the present invention is shown. In this arrangement, the TFT of FIGS. 1*a-b* has been omitted since its presence is not of relevance to the subject-matter to be illustrated. Compared to the prior art reflective pixel shown in FIGS. 1*a-b*, an insulative reflective layer 20, such as a cholesteric liquid crystal layer, has been inserted between a lower electrode 21 and an alignment layer 18. The material of the lower electrode 21 has been chosen in order to minimize the DC component present in the LC layer 10. Preferably, the lower electrode 21 is made of the same material as the upper electrode, such as ITO or IZO.

If the lower electrode 21 and the upper electrode 13 are grounded with Al-wires in the same manner as described above, it is straight-forwardly realized that the residual DC electric field in the LC layer 10 becomes zero. The flicker in the pixel is thus eliminated or, at least, greatly reduced.

In FIG. 3, a schematic section view of a reflective pixel in a liquid crystal display according to a second embodiment of the invention is shown. Here, the insulative reflective layer in FIG. 2 has been replaced by a conductive reflective layer 30, for example made of Al, and an insulating layer 31. The insulating layer is positioned between the lower electrode 21 and the conductive reflective layer 30 and can be made of, for example, SiO or polyimide. In this configuration, as well as in that shown in FIG. 2, there is electric symmetry with respect to the LC layer 13. It should, however, be noted that an important prerequisite for this is that the conductive reflective layer 30 is charge-neutral compared to the upper electrode 10.

The LC drive signals are capacitively coupled from the lower electrode 21 to the reflective conductive electrode 30 with a capacitance given by the properties of the insulating layer 31. In order for the capacitive coupling to be as efficient as possible, the insulating layer 31 is preferably thin—in the order of 50 nm—and pin-hole free. A multi-layer structure could be utilized to achieve a pin-hole free layer.

In FIG. 4*a* a schematic section view of a transflective pixel in a liquid crystal display according to a first example of a third embodiment of the invention is shown. In the transflective pixel shown in FIG. 4*a*, the center region of the pixel constitutes a transmissive sub-pixel T, while the remainder of the pixel constitutes a reflective sub-pixel R. In FIG. 4*a*, for the sake of simplicity, only the relevant layers and components have been included. In the transmissive sub-pixel T, the liquid crystal material 10 is sandwiched between an upper transparent electrode 13 and a lower transparent electrode 21. The lower transparent electrode 21 is here shown not covered with the insulating layer 31, but could be covered with the insulating layer without any noticeable effect on the performance of the LCD. In the reflective sub-pixel R, a spacer layer 40, for example made of a photoresist, a second conductive layer 41 and a via 42, electrically connecting the second conductive layer 41 and the reflective layer 30, have been added. The spacer layer 40 is designed to bring the reflective layer 30 upwards about half the distance between the lower electrode 21 and the upper electrode 13 in order to enable the same optical path length for the reflective sub-pixel R as for the transmissive sub-pixel T. Furthermore, the spacer layer has a deliberately roughened top surface to generate a diffusive reflection. Here, the second conductive layer 41, the via connector 42 and the reflective layer 30 are all made of the same material, for example Al. Thereby, no contact potential is generated at any of the interfaces between these elements. With the configuration according to FIG. 4*a*, no DC electric field is created in the LC layer either in the transmissive sub-pixel T or in the reflective sub-pixel R. By positioning the second conductive layer 41 close to the lower electrode 21, a strong capacitive coupling between these two layers is ensured. Specifically, the capacitance of the parallel-plate capacitor formed by the lower electrode 21—insulating layer 31—second conductive layer 41 can be kept considerably larger than that of the parallel-plate capacitor formed by the reflective layer 30—LC layer etc. 10—upper electrode 13.

According to a second example of a third embodiment of the invention, schematically shown in FIG. 4*b*, the potential of the lower electrode 21 is instead transmitted through the spacer layer 40 to a second conductive layer 41 by means of a via connector 42, which is in galvanic contact with the lower electrode 21. The second conductive layer 41, here applied on top of the spacer layer 40, is separated from the reflective layer 30 by an insulating layer 31. The signal applied to the lower electrode 21 is then capacitively coupled to the reflective layer 30. In order to obtain electric symmetry with respect to the LC layer, the second conductive layer 41 and the via connector 42 should, in this second example, be made of a material with a work function close to that of the transparent lower electrode 21. If the lower electrode 21 is made of ITO, Mo would be a suitable choice of material for the second conductive layer 41 and the via connector 42.

According to a third example of a third embodiment of the invention, schematically shown in FIG. 4*c*, the upper electrode 13 and the lower electrode 21 have been coated with insulative passivation layers 50, 51. These passivation layers 50, 51 protect the transparent upper and lower electrodes 13, 21 from being degraded by exposure to radiation, such as sunlight. Especially, the work functions of the transparent upper and lower electrodes 13, 21 are stabilized so that flicker is prevented from occurring over time due to radiation.

The function of the lower passivation layer 51 can be fulfilled by the previously described insulation layer 31. On the upper electrode 13, an additional layer is added. This layer can be formed through any surface deposition technique, such as sputtering, and is preferably composed by one or more layers of oxides, such as AlxOy, SixOy, nitrides, such as SixNy, or spin-on polymers.

In FIG. 5a, a first method of discharging a conductive reflective layer in a pixel according to the second and third embodiments of the invention is shown.

At some suitable point in the manufacturing process, the electrically floating conductive reflective layer 30 is connected to the lower electrode 21 via a voltage source 60. The lower electrode 21 is connected to ground and the reflective layer 30 and the lower electrode 21 are separated by an insulating layer 31. In order to cancel the contact potential arising between the lower electrode 21 and the reflective layer 30 due to the work function difference between them, a counter-voltage is applied between the two layers by means of the voltage source 60. When a suitable voltage has been applied—in the case of the lower electrode being made of ITO and the reflective layer made of Al, the voltage should be 0.8 V—the connection is broken. As a result, the reflective layer 30 will be uncharged with respect to the lower electrode. The procedure described above can be analogously performed by connecting the reflective layer 30 with the transparent upper electrode (not shown in this figure). One is thus ensured that no DC contribution from the electric field in the LC layer will result from residual charge in the reflective layer.

In FIG. 5b, a second method of discharging a conductive reflective layer in a pixel according to the second and third embodiments of the invention is shown.

According to this method, the conductive reflective layer 30 is contacted by a large slab 70 made in the same material as the reflective layer 30. This operation takes place before the final assembly of the LC-display and the lower electrode 21 should be grounded while the reflective layer 30 and the slab 70 are placed in contact with each other. The slab 70 should not be grounded, but in order to effectively dilute the charge on the reflective layer, the capacitance to ground of the slab 70 should be much larger than the capacitance to ground of the reflective layer 30.

The person skilled in the art realizes that the present invention by no means is limited to the preferred embodiments. For example, the materials mentioned are provided as examples of materials with suitable properties, and any other materials with suitable properties should be regarded to fall within the scope of the present invention.

The invention claimed is:

1. A liquid crystal display having a plurality of pixels, comprising:
   a lower electrode and an upper electrode;
   a liquid crystal layer arranged between the upper and lower electrodes;
   a reflective layer between the liquid crystal layer and the lower electrode, for at least partly reflecting incident light having passed through the liquid crystal layer, the reflective layer and the lower electrode being electrically isolated from each other; and
   a conductive layer between the reflective layer and the lower electrode;
   wherein the reflective layer is electrically conductive and the conductive layer between the reflective layer and the lower electrode is separated from the lower electrode layer by an insulating layer and connected to the reflective layer by a via connector extending through a spacer layer.

2. A liquid crystal display according to claim 1, wherein a work function of the lower electrode differs from a work function of the upper electrode by less than 0.5 eV.

3. A liquid crystal display according to claim 1, wherein the lower electrode and the upper electrode are manufactured in the same transparent material.

4. A liquid crystal display according to claim 1, wherein the upper electrode is coated with a passivation layer, thereby improving the light stability of the liquid crystal display.

5. A liquid crystal display according to claim 1, wherein the reflective layer is electrically conductive and an electrically insulating material is arranged to separate the lower electrode and the reflective layer.

6. A liquid crystal display according to claim 5, wherein a capacitance between the reflective layer and the lower electrode is more than 10 times as large as a capacitance between the reflective layer and the upper electrode.

7. A liquid crystal display according to claim 1, wherein connecting the conductive layer to the reflective layer by the via connector extending through the spacer layer enhances a capacitive coupling between the lower electrode and the reflective layer.

8. A liquid crystal display according to claim 1, wherein each pixel comprises a reflective sub-pixel (R), which is arranged to reflect incident light, and a transmissive subpixel (T), which is arranged to transmit light.

9. A liquid crystal display according to claim 8, wherein each reflective sub-pixel (R) further comprises a spacer layer positioned between the lower electrode and the reflective layer.

10. A liquid crystal display having a plurality of pixels, comprising:
    a lower electrode and an upper electrode;
    a liquid crystal layer arranged between the upper and lower electrodes;
    a reflective layer between the liquid crystal layer and the lower electrode, for at least partly reflecting incident light having passed through the liquid crystal layer, the reflective layer and the lower electrode being electrically isolated from each other; and
    a conductive layer between the reflective layer and the lower electrode that is at least one of (a) separated from the lower electrode layer by an insulating layer and connected to the reflective layer by a via connector extending through a spacer layer, or (b) separated from the reflective layer by an insulating layer and connected to the lower electrode layer by a via connector extending through a spacer layer;
    wherein each pixel comprises a reflective sub-pixel (R), which is arranged to reflect incident light, and a transmissive subpixel (T), which is arranged to transmit light.

11. A liquid crystal display according to claim 10, wherein each reflective sub-pixel (R) further comprises a spacer layer positioned between the lower electrode and the reflective layer.

12. A liquid crystal display having a plurality of pixels, comprising:
    a lower electrode and an upper electrode;

a liquid crystal layer arranged between the upper and lower electrodes;

a reflective layer between the liquid crystal layer and the lower electrode, for at least partly reflecting incident light having passed through the liquid crystal layer, the reflective layer and the lower electrode being electrically isolated from each other, the reflective layer being electrically conductive; and an electrically insulating material arranged to separate the lower electrode and the reflective layer;

wherein the reflective layer is arranged to be discharged through a discharging means, which is configured to discharge the reflective layer with a time constant being considerably longer than an LCD drive period, and to bring the reflective layer to the same potential as the upper electrode.

13. A liquid crystal display according to claim 12, wherein each pixel comprises a reflective sub-pixel (R), which is arranged to reflect incident light, and a transmissive subpixel (T), which is arranged to transmit light.

14. A liquid crystal display according to claim 13, wherein each reflective sub-pixel (R) further comprises a spacer layer positioned between the lower electrode and the reflective layer.

15. A liquid crystal display according to claim 12, wherein a capacitance between the reflective layer and the lower electrode is more than 10 times as large as a capacitance between the reflective layer and the upper electrode.

16. A liquid crystal display according to claim 12, wherein a work function of the lower electrode differs from a work function of the upper electrode by less than 0.5 eV.

17. A liquid crystal display according to claim 16, wherein the lower electrode and the upper electrode are manufactured in the same transparent material.

18. A liquid crystal display according to claim 12, wherein the lower electrode and the upper electrode are manufactured in the same transparent material.

19. A liquid crystal display according to claim 12, wherein the upper electrode is coated with a passivation layer.

20. A liquid crystal display having a plurality of pixels, comprising:

a lower electrode and an upper electrode;

a liquid crystal layer arranged between the upper and lower electrodes;

a reflective layer between the liquid crystal layer and the lower electrode, for at least partly reflecting incident light having passed through the liquid crystal layer, the reflective layer and the lower electrode being electrically isolated from each other; and a conductive layer between the reflective layer and the lower electrode;

wherein said reflective layer is electrically conductive and the conductive layer between the reflective layer and the lower electrode is separated from the reflective layer by an insulating layer and connected to the lower electrode layer by a via connector extending through a spacer layer.

21. The liquid crystal display of claim 20 in which the lower electrode and the upper electrode are manufactured in the same transparent material.

22. The liquid crystal display of claim 20 in which the upper electrode is coated with a passivation layer, thereby improving the light stability of the liquid crystal display.

23. The liquid crystal display of claim 22 in which a capacitance between the reflective layer and the lower electrode is more than 10 times as large as a capacitance between the reflective layer and the upper electrode.

24. The liquid crystal display of claim 20 in which connecting the conductive layer to the lower electrode by the via connector extending through the spacer layer enhances a capacitive coupling between the lower electrode and the reflective layer.

25. The liquid crystal display of claim 20 in which a work function of the lower electrode differs from a work function of the upper electrode by less than 0.5 eV.

* * * * *